United States Patent
Adebar et al.

(10) Patent No.: US 6,668,501 B2
(45) Date of Patent: Dec. 30, 2003

(54) STUCCO FASTENING SYSTEM

(75) Inventors: Perry Adebar, Surrey (CA); Harold R. Davis, Vancouver (CA); William Spilchen, White Rock (CA); Abraham Sacks, Vancouver (CA)

(73) Assignee: Sacks Industrial Corp., Vancouver (CA)

( * ) Notice: Subject to any disclaimer, the term of this patent is extended or adjusted under 35 U.S.C. 154(b) by 0 days.

(21) Appl. No.: 09/783,079

(22) Filed: Feb. 15, 2001

(65) Prior Publication Data

US 2002/0108339 A1 Aug. 15, 2002

(51) Int. Cl.[7] .................................................. E04B 9/00
(52) U.S. Cl. .............................. 52/363; 52/454; 52/443; 411/480; 411/482; 411/441; 411/546; 411/155; 411/156
(58) Field of Search .................... 52/454, 443; 411/480, 411/482, 441, 546, 155, 156

(56) References Cited

U.S. PATENT DOCUMENTS

| | | | | |
|---|---|---|---|---|
| 1,276,764 A | * | 8/1918 | Holbrook, Sr. | |
| 1,363,018 A | * | 12/1920 | Sexton | |
| 1,405,579 A | * | 2/1922 | Graham | |
| 1,434,915 A | * | 11/1922 | Schofield | |
| 1,801,530 A | * | 4/1931 | Overmire | |
| 3,600,868 A | * | 8/1971 | Wilson | 52/336 |
| 4,558,552 A | * | 12/1985 | Reitter, II | 52/741 |
| 4,841,705 A | * | 6/1989 | Fuhrer | 52/510 |
| 4,897,007 A | * | 1/1990 | Chen et al. | 411/401 |
| 5,755,545 A | * | 5/1998 | Banks | 411/482 |
| 6,035,595 A | * | 3/2000 | Anderson | 52/363 |

\* cited by examiner

Primary Examiner—Carl D. Friedman
Assistant Examiner—Steve M Varner
(74) Attorney, Agent, or Firm—Oyen Wiggs Green & Mutala

(57) ABSTRACT

A shear wall system comprises stucco fasteners consisting of an elongated first portion that is driven into a wood frame wall, and an elongated second portion that is completely embedded in a stucco wall panel. In one embodiment, the fasteners consist of an assembly having a first element that is driven into the wood frame wall, and a second annular element receiving a portion of the first element and that is embedded rigidly into the cement stucco wall. Ductile movement of the fastener components with respect to wood frame wall and the stucco wall provides energy dissipation.

28 Claims, 10 Drawing Sheets

STUCCO FASTENING SYSTEM

FIELD OF THE INVENTION

This invention relates to thin concrete or stucco wall panels. In particular this invention relates to means for securing stucco wall panels to wood frames to improve the shear resistance to cyclic loading such as from earthquakes or wind.

BACKGROUND OF THE INVENTION

In building and structural design, structural elements need to be incorporated in the design to adequately withstand rack shear loads imposed by earthquakes or high winds. Common methods to achieve this shear strength are through the use of moment resistant frames, cross bracing, or through shear resistant structural diaphragms. Wood frame shear walls are a primary lateral force-resisting element in wood frame structures. Their behavior is often considered analogous to a deep cantilever beam with the end-framing members acting as "flanges" or "chords" to resist overturning moment forces and the panel acting as the "web" to resist shear. This analogy is generally considered appropriate for wind and seismic design. The structural elements of the building wall of interest are described by properties such as strength, stiffness, and ductility. Common diaphragm materials would be plywood sheathing, oriented strand board (OSB), or gypsum wall board (GWB).

In certain areas of North America, such as the Western States of the U.S., another material that is commonly used to provide shear strength is stucco cladding. Stucco is a Portland cement plaster that is reinforced with either wire lath, or expanded metal lath.

The stucco is normally ⅞ inch thick and achieves compressive strengths of 1,500 to 2,800 psi.

The lath serves several functions. First, it provides reinforcement for the stucco to provide tensile strength, similar to structural concrete design. Second, it provides the means for attachment of the stucco cladding to the building framework. The lath is attached in a prescribed manner. Usually fasteners are applied every 6 inches vertically on studs and every 6 inches horizontally along the top and bottom plates for each storey. In the case of wood framing, the fasteners are often roofing nails but they may be staples.

With the use of such stucco wall cladding, engineers have been allowed to use a shear value of 180 lbs. per foot to resist rack shear forces in their designs. Following the Northridge Calif. earthquake of Jan. 17, 1994, it was found that some buildings constructed with stucco shear walls suffered premature failures. Subsequently, some building officials have lowered the shear rating for stucco to 90 lbs. per foot in specific seismic areas.

Failure of the stucco cladding was primarily caused by failure of the attachment of the reinforcing lath to the framing. The normal method of attaching the lath is to drive a nail alongside a wire and hold the wire under one side of the head of the nail. Where possible, the nails are driven at the intersections of the wire lath, but the wires are still only held under one side of the nail head. For unidirectional loading, such as wind forces, the fastening is adequate. However, during reversing cyclic loading such as an earthquake, the fastening is inadequate. During an earthquake of high intensity, there is relative movement between the stucco cladding and the building framing. With displacement in the first direction a number of fasteners will disengage from the lath. With displacement in the other direction, more fasteners will disengage. Over a few cycles, the majority of fasteners will be disengaged.

Since the wire sizes in wire laths used in the Northridge Calif. earthquake were relatively small, usually 0.050 to 0.062 inches in diameter, they had limited strength. Under cyclic loading where the nails did not disengage from the wire, the loading broke the wire. On some buildings, construction staples had been used to attach the lath. The performance of staples was worse than the nails, since it was found that each leg sheared with the reversing cyclic loads. Accordingly, there is a need for an improved method for transferring rack shear forces to a building frame.

Wood framing for a wall without sheathing or diagonal bracing is essentially a low strength structure that deforms readily under shear loads. Shear walls have traditionally used sheathing, such as plywood, that is very stiff under shear loads to reinforce the wood framing. The sheathing is fastened to the wood framing by nails using a nailing pattern that meets engineering requirements. Under in-plane shear loads, the nail fasteners are the ductile elements that deform and provides the inelastic behaviour that is essential for energy dissipation in cyclic loading.

Stucco wall panels can provide effective reinforcement for wood framed shear walls if a suitable method is used to attach the panels to the wood frame. Nails, such as used to attach plywood sheathing to a wood frame, are not suitable for stucco. Nails will pull out of the stucco by local brittle fracture mechanism under tension loading. Nails will crack the stucco when the local yield stress is exceeded under shear loading.

The problem of providing attachment between a shear-resisting element and a structure under in-plane shear loading has been addressed by many building structure designers. In 1999, Utzman was granted U.S. Pat. No. 5,870,870 for metal shear panel fasteners to fasten shear resistant diaphragms to framing elements in the construction of framed building. Ulzman claims a special fastener similar to a "duplex" nail for attaching the diaphragms to the wood building frame. The application was to attach metal-faced gypsum wallboard to wood frame construction for shear walls. Although Utzman claims that his invention provides good shear resistance, the system is not suitable for fabricated-in-place stucco wall finishes.

In 1996, Irimies was granted U.S. Pat. No. 5,493,833 for a welding stud used in the construction industry for providing a shear connection between cast-in-place concrete and structural steel. Irimies provided the optimum dimensions for an array, or group, of studs to develop full shear strength when embedded in concrete. The welding stud has applications only in cast-in-place concrete structures that are attached to steel structural members to which the studs can be welded. The objective of that shear connection is to create a joint between the concrete and the structural steel that is stiff and strong. The connection does not, however, provide ductility and is not suitable for wood frame construction.

In 1995, Ruiz et. al. was granted U.S. Pat. No. 5,414,972 for a reinforced structural member to be used in the construction industry for providing a shear connection between a concrete building panel and a reinforcing member that will be fastened to a building structural member. The main application is to attach pre-fabricated building panels to a steel building framework. Ruiz shows a reinforcing member having a multiplicity of projections that embed in concrete to provide full shear strength. As in the Irimies invention, this shear connection is not capable of providing any ductility.

In 1989, Grimaud was granted U.S. Pat. No. 4,841,703 for a connection system to create a composite beam structure from a concrete slab cast over wooden floor beams. The connectors are tubes inserted into the concrete slab and the wood floor beams along the common interface to provide sufficient material to carry the shear loads. The object of the invention is to create an integral structure with no relative motion between components. Grimaud made reference to another connection system that uses vertical nails that are partially engaged in the faces of the wood floor beams and embedded into the concrete during casting. [Godycki et. al. "Verbunddecke aus Holzrippen unde Betonplatte", Bauingenieur 59 (1984), 477–483, Springer-Verlag, Germany]. Such connectors suffer from limited shear strength and either deform readily or break at the interface, and hence are not suitable for attaching thin vertical panels of stucco cladding to wood frame walls.

The object of the present invention is to provide a thin concrete or stucco wall construction system that provides improved shear resistance and ductility to in-plane cyclic shear loading.

SUMMARY OF THE INVENTION

This invention has a primary function of transferring shear loads between the stucco wall panels and the wood building frame, especially during cyclic shear loading of a wall structure. An important secondary function of the shear fastener is to permit relative motion between the essentially inelastic stucco wall panels and the relatively flexible wood building frame. The design of the shear fastener provides energy dissipation due to inelastic action during the cyclic motion. The strength and stiffness of the wall during shear loading are important parameters. The shear load per unit of lateral displacement (drift) is the stiffness of the wall structure. For low shear loads, the wall structure is often elastic wherein the lateral displacement reduces to zero when the load is removed. At higher loads, the lateral displacement is not recovered when the load is removed indicating inelastic behaviour of the wall system. Inelastic behaviour means that some elements of the wall are permanently deformed by the shear loads.

An element of the invention is a connector similar to a shear stud known in the construction industry for bonding concrete to steel floor decks, structural beams, and similar elements. In this invention, the connector transfers shear force between the wood building frame construction and the stucco wall panels, in particular seismic shear force due to earthquake motions of the building structure.

A shear stud connector comprises metal studs, each having at one end a head or section with a larger diameter than the body of the metal stud, also having a second section of larger diameter part way along the metal stud. The concrete is applied to fully encase the body of the metal stud in the region between the two increased sections. The embedded shear capacity of a metal stud depends on a number of factors including: (a) the properties of the concrete such as weight, compressive strength, and modulus of elasticity; (b) the properties of the metal stud such as the shank diameter, the head size, and the yield strength of the metal stud material; and (c) the geometric properties of the shear connector such as the metal stud spacing and grouping.

When the shear fasteners of this invention are used in an approved method, they are keyed rigidly into the stucco wall panels and inserted into the wood building frame. The fasteners then carry both static and dynamic tension and shear loads consisting of the dead weight of the stucco wall panels and wind and seismic loading on the building.

The basic concept is that stucco is a stiff and strong material that, if properly connected to the wood frame structure, is capable of resisting significant in-line shear forces (similar to or greater than plywood shear walls). Currently, the seismic shear connection between stucco and the wood frame construction relies on the nailed connection of the wire lath to the wood studs, which is inadequate for cyclic loading. With the addition of the connector described in this invention to the stucco clad building wall, the magnitude of the shear that needs to be transferred between the wood frame, wire nails, reinforcing wire, and stucco panels is greatly reduced. The main purpose of the traditional connection is to tie the stucco and studs together in order to prevent buckling of the thin stucco, and to help support the dead weight of the stucco.

The invention has been developed so that, in a stucco shear wall, the inelastic action occurs primarily in the fasteners between the wood building frame and the stucco wall panels. Further, the invention has been developed so that the inelastic action in the fasteners is confined to the interface region between the stucco and the wood building frame including permanent deformation of the wood frame at the insertion regions of the fasteners. Ultimately, the stucco wall panel will develop cracks for large seismic motion.

The fastener element of this invention has been developed to extend an optimum distance into the stucco to provide the required strength, but at the same time maintaining adequate cover of the stucco to protect the fastener from corrosion. The fastener is preferably made of corrosion resistant materials or plated with a corrosion resistant material such as zinc to improve its function.

In one embodiment, the fastener consists of an elongated portion that is driven into a wood frame wall, and an elongated second portion that is completely embedded in the stucco wall panel. In a further embodiment, the fastener consists of two parts; the first being a shaft with a headed end and a pointed end that is driven into the wood frame wall, and the second part being an annular body that is embedded rigidly into the cement stucco wall. The first part of the fastener passes through the annular body of the second part to lock the two components together. The external shape of the annular body is developed to provide adequate anchorage against combined bending and pullout from the stucco, which sets around it. The internal hole in the annular body is sized to fit the shaft of the first part of the fastener.

The fastener of this invention has been developed to provide adequate pullout resistance from the wood building frame, while at the same time providing appropriate bending stiffness for the energy absorption function of fastener. The grade of steel used to form the shear lock provides the required strength, while the type of steel used in the device provides adequate low-cycle fatigue capacity. Typically, the material for the fastener could be similar to low carbon 1008 steel that has been work hardened to provide a yield strength of 70,000 psi although many other variations are possible.

When the fastener system is applied in the proper locations described below, and is combined with other important properties of reinforced stucco, the resulting system may be characterized as an "engineered stucco" system that is capable of resisting very significant seismic shear forces.

The fasteners should be provided along all horizontal edges where shear is to be transferred between the wood frame construction and the stucco wall panels. These are primarily along the bottom and top plates of shear walls at each floor level. In addition, for shear wall panels that have height-to-width ratios greater than 0.5, the connectors must be provided along vertical edges of the wall panels, in addition to the horizontal edges.

In one aspect the invention is the method of applying stucco to a wall having wood frame members wherein the stucco is applied to a lath, the method comprising fastening the stucco directly to the wood frame members separate from the lath. The direct fastening may be through a building sheathing membrane.

In another aspect of the invention, the method comprises securing stucco lath to the wood frame members or building wall sheathing by means of first fasteners, securing a plurality of second fasteners to the wood frame members and applying stucco over the lath and the second fasteners whereby to embed a portion of the second fasteners in the stucco.

In another aspect, the invention is a stucco wall construction comprising wood frame members, lath secured to the wood frame members, a panel formed by the stucco on the lath, and means separate from the lath to fasten the stucco directly to the wood frame members.

The means for fastening the stucco directly to the wood frame may comprise fasteners having a first elongated portion that is driven into the wood frame members, and a second elongated portion that is completely embedded in the stucco panel.

In an other of its aspects, the invention is the method of applying stucco on the wood frame of a building wall comprising the steps of: securing stucco lath to the wood frame by means of a plurality of first fasteners, embedding in the wood frame a plurality of second fasteners, the second fasteners comprising an elongated first portion embedded in the wood frame and an elongated second portion not embedded in the wood frame, the second portion including a head spaced from the surface of the wood frame, and, applying stucco to the stucco lath so as to substantially embed the heads of the second fasteners in the stucco.

In yet another of its aspects, the invention is a stucco wall construction comprising a wood frame, stucco lath secured to the wood frame by a plurality of first fasteners, a plurality of second fasteners embedded in the wood, the second fasteners comprising an elongated first portion embedded in the wood frame and an elongated second portion not embedded in the wood frame, the second portion including a head spaced from the surface of the wood frame and stucco applied to the stucco lath so as to substantially embed the heads of the second fasteners in the stucco.

In yet another of its aspects, the invention is a fastener assembly for use in a stucco wall construction comprising a first element having an elongated portion and a head portion, the elongated portion having a substantially uniform cross section along its length, and a second element having an aperture for receiving the first element therethrough, whereby to maintain the head of the first element in a predetermined spaced relationship to a surface in which the first element is embedded.

In another of its aspects, the invention is a method of applying to stucco to a wall having wood frame members wherein the stucco is applied to a lath or a wire mesh, comprising fastening the lath or wire mesh to the wood frame members by means of first fasteners, securing a plurality of the fastener assemblies by driving the elongated portion of the first element of the assembly through an aperture in a second element of the assembly and into the wood frame member, and applying stucco to substantially embed the second element in the stucco.

In another aspect, the invention is a sleeve element for use in conjunction with a fastener for a stucco wall construction comprising a first end and a second end defining a longitudinal axis, an axial passageway extending along the longitudinal axis, and an outer surface between the first and second ends, the outer surface having a varying cross section along its length.

In another aspect, the invention is a stucco wall construction comprising a wood frame, stucco lath secured to the wood frame by a plurality of first fasteners, a plurality of second fasteners embedded in the wood, the second fasteners comprising a fastener assembly having a first element having an elongated portion and a head portion, the elongated portion having a substantially uniform cross section along its length, and a second element having a passageway for receiving the first element therethrough, whereby to maintain the head of the first element in a predetermined spaced relationship to a surface in which the first element is embedded.

In yet a further of its aspects, the invention is a fastener assembly for use in a stucco wall construction comprising a first element having an elongated portion and a head portion, the elongated portion having a substantially uniform cross-section along its length, and a second element having a passageway for receiving the first element therethrough, whereby to maintain the head of the first element in a predetermined spaced relationship to a surface in which the first element is embedded, the second element having an upper end and a lower end, and wherein the second element encloses the head of the first element in the upper end so as to restrain it from relative upward axial movement.

Other aspects of the invention will be appreciated by reference to the description of the preferred and alternative embodiments thereof and to the claims wherein the various additional aspects of the invention are defined.

BRIEF DESCRIPTION OF THE DRAWINGS

The detailed description of the preferred and alternative embodiments of the invention will proceed by reference to the drawings in which.

DETAILED DESCRIPTION OF THE PREFERRED AND ALTERNATIVE EMBODIMENTS

The improved stucco fastening system provides an interconnection between a wood frame structure and a stucco building panel through a plurality of shear fasteners. These fasteners are attached to the wood frame in locations that provide suitable transfer of in-plane shear forces from the movement of the frame to the stucco building panel. The design of the fasteners that are embedded into the stucco building panel achieves the best strength against pullout and shear failure. Several configurations are possible for shear fasteners for wood frame buildings with stucco cladding to provide desirable characteristics.

Figure 1:
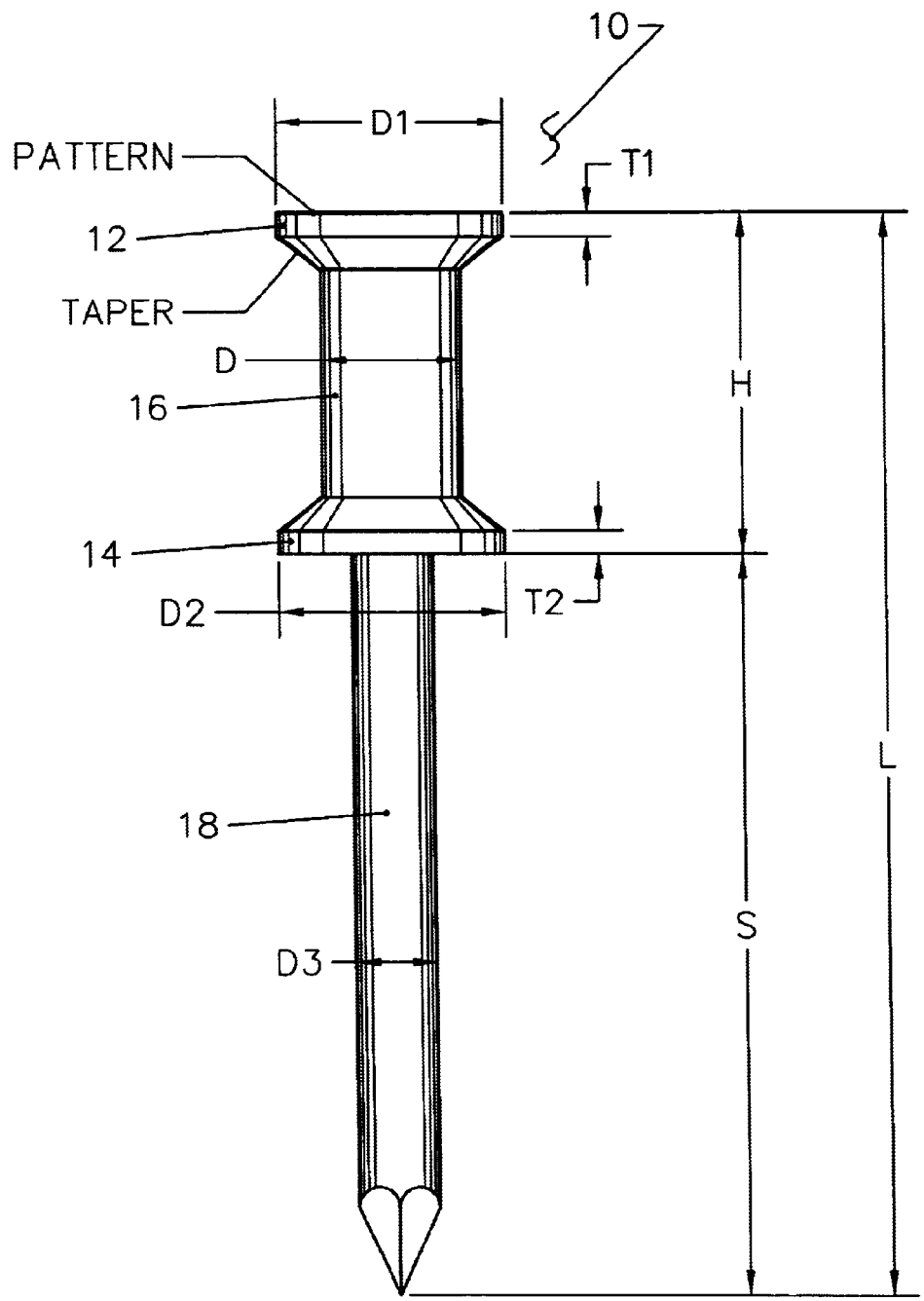
FIG. 1 is an elevation of the first embodiment of a fastener according to the invention.

FIG. 1 shows one embodiment of a shear fastener that consists of a fastener 10 consisting of a metal stud, having at an upper end a head 12 with a larger diameter than the upper shaft body 16 of the metal stud 10, and also having a lower end 14 of larger diameter than the upper body shaft 16 spaced along the metal stud 10. The upper body shaft 16 of the metal stud 10 forms of a middle portion between the upper and lower ends. The upper body shaft 16 has diameter D that typically is between 0.2 and 0.5 inches. The first head 12 has diameter D1, which preferably is equal or greater than 2D. The second head 14 has diameter D2 preferably equal or greater than 2D. The stucco is applied to fully encase the upper body shaft 16 and both head 12 and head 14 of the metal stud 10. The upper body shaft 16 of the metal stud 10 has length H that should be greater than D for good pullout strength from the stucco. The stucco should completely cover the head of the upper body first head 12, typically by 0.12 inches so that it is embedded in the stucco. The inner surface of the head 12 and head 14 is tapered preferably at a shallow angle to the head outer surface. The lower body shaft 18 of the metal stud 10 has diameter D3, which preferably has dimensions between D and D/2. The embedment length S of the shear locking fasteners into the wood frame member is preferably greater than 5D but less than 10D although other embedment depths may be employed, depending on the ductility required for the interconnection between the wood frame structure and the stucco building panel.

Figure 2:
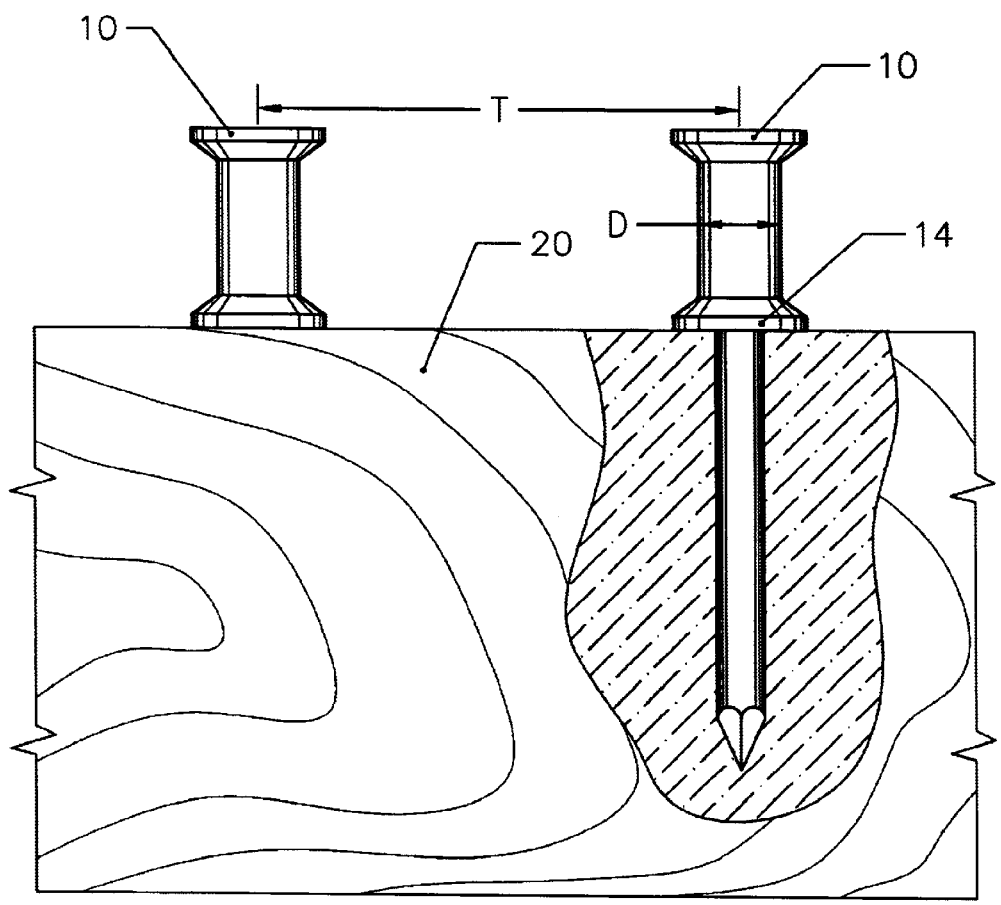
FIG. 2 is an elevation of the shear connection system with a partial cutaway section showing two fasteners embedded into the wood frame structure according to the first embodiment of the invention.

In a preferred embodiment shown in FIG. 2, the shear fastener consists of a series of metal studs 10 (only two are shown) inserted into a wood frame member 20 until the second head 14 is flush with the surface of the wood. The metal studs are spaced apart distance T along the wood frame member 20 where T is preferably less than 10D for maximum strength in the stucco.

Figure 3:
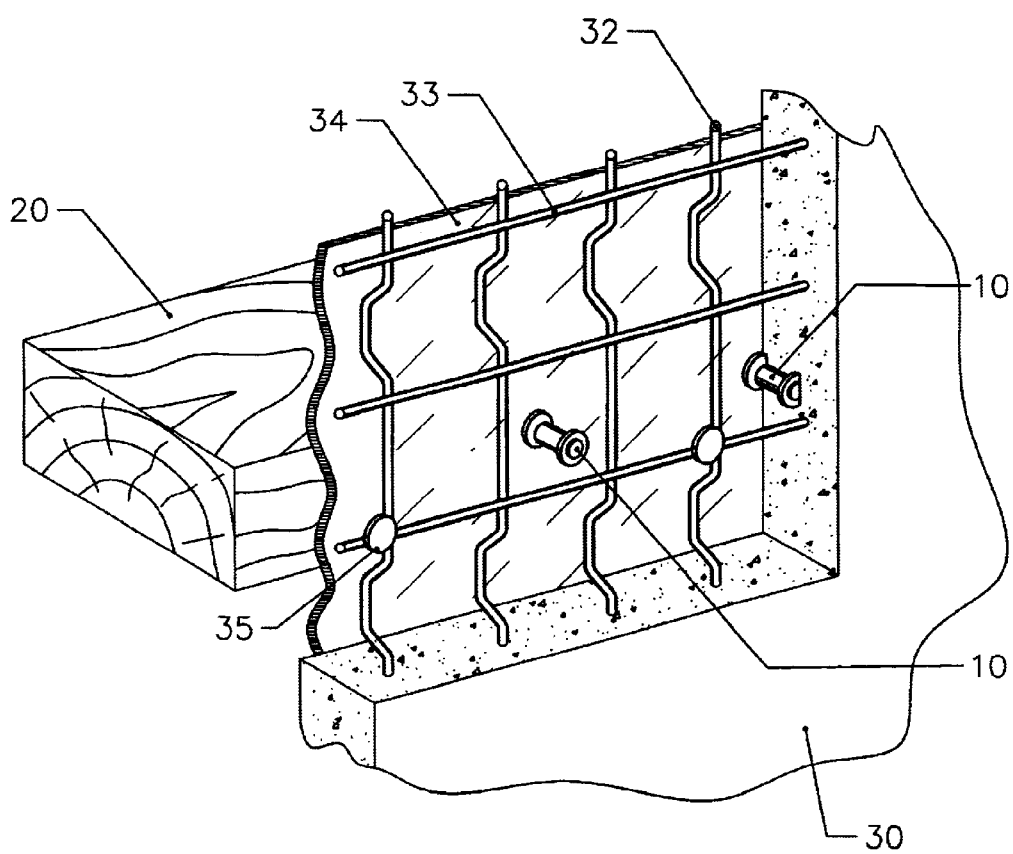
FIG. 3 is a perspective view of a building wall showing the stucco wall panel, the wire mesh reinforcement, the building paper, and the wood frame structure, with fasteners according to the first embodiment of the invention.

FIG. 3 shows the elements of the shear fastener system consisting of a plurality of metal studs 10, the stucco panel 30, the wire mesh reinforcement 32, building paper or sheathing membrane 34, and the wood frame member 20 according to the first embodiment of the invention. The wire mesh 32 is embedded into the stucco panel 30 and is attached with fasteners 35 to the wood frame member 20. The wire mesh 32 may be welded mesh as shown or may be woven wire mesh or metal lath as is known in the building trades.

The method of the invention involves the fastening the stucco 30 to the wood frame members 20 by direct means other than by the intermediary of the wire mesh reinforcement or lath 32. The wire mesh or stucco lath is secured to the wood frame members 20 (or alternatively to building wall sheathing) by means of conventional fasteners. A plurality of metal studs 10 are then secured to the wood frame members at several spaced locations in preparation for the application of the stucco. The stucco is then applied over the wire mesh or lath so as to completely embed the upper body shaft and head (16 and 12 in FIG. 1) in the stucco 30. Thus the stucco is fastened directly to the wood frame members by means of metal studs 10.

Figure 4:
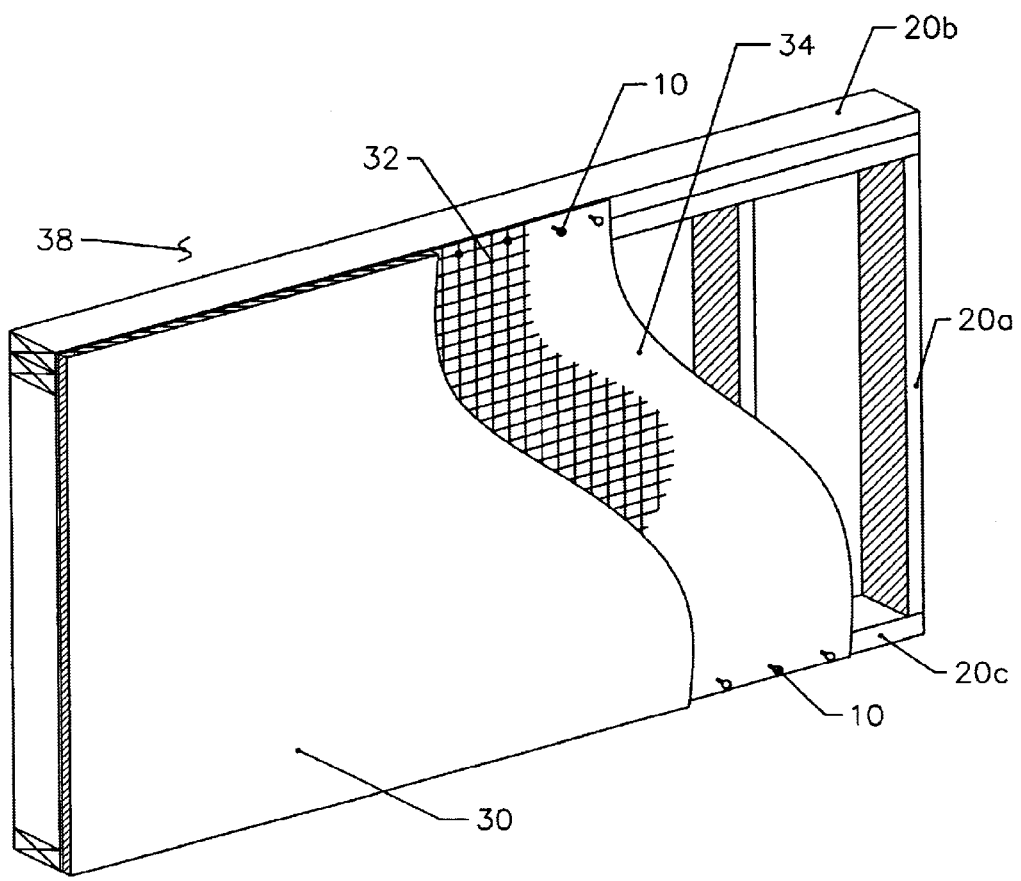
FIG. 4 is a perspective view of a building wall showing the stucco wall panel, the wire mesh reinforcement, the building paper, and the wood frame structure, with an indication of the preferred placement for fasteners.

FIG. 4 demonstrates the preferred embodiment for the elements of a building wall 38 that consist of: a wood building frame with vertical wood frame members 20a and horizontal wood frame members 20b and 20c, building paper 34 over the wood frame members, wire mesh reinforcement 32 that is fastened to the wood frame members, and the stucco panel 30 with embedded wire mesh 32, and also a multiplicity of metal studs 10. In this preferred embodiment, the shear fasteners are attached to the horizontal wood frame members 20b and 20c where they provide the best effect for transferring shear forces from the building frame to the stucco panel.

Each metal stud 10 in the embodiment shown in FIG. 4 has an embeddable elongated portion (e.g. 18 in FIG. 1). The metal stud acts as a fastener and its embeddable elongated portion is driven, like a nail, into the horizontal wood frame members 20b and 20c until the base of the second section 14 of the metal stud 10 contacts the face of the building paper attached to the surface of the wood. The metal studs are driven into the wood after building paper 34 is in place and after the reinforcing wire mesh 32 is attached to the wall by nails or other approved fasteners (not shown in this figure). Stucco is then applied to cover and embed the head of the portion (also elongated) that remains not embedded in the wood. The head (12 in FIG. 1) remains spaced from the surface of the wood frame. Tests have shown that a traditional three coat stucco finish surface with stucco lath, has an optimum spacing for metal studs about 4 inches apart when the upper body of the metal stud has diameter D about 0.375 inches and the lower body shaft has diameter D3 about 0.15 inches. Under these circumstances, the stucco fails in shear at about the same loading as the metal studs fail. The predicted failure loading in shear is between 1500 and 2000 pounds per lineal foot of wall from these tests.

Figure 5:
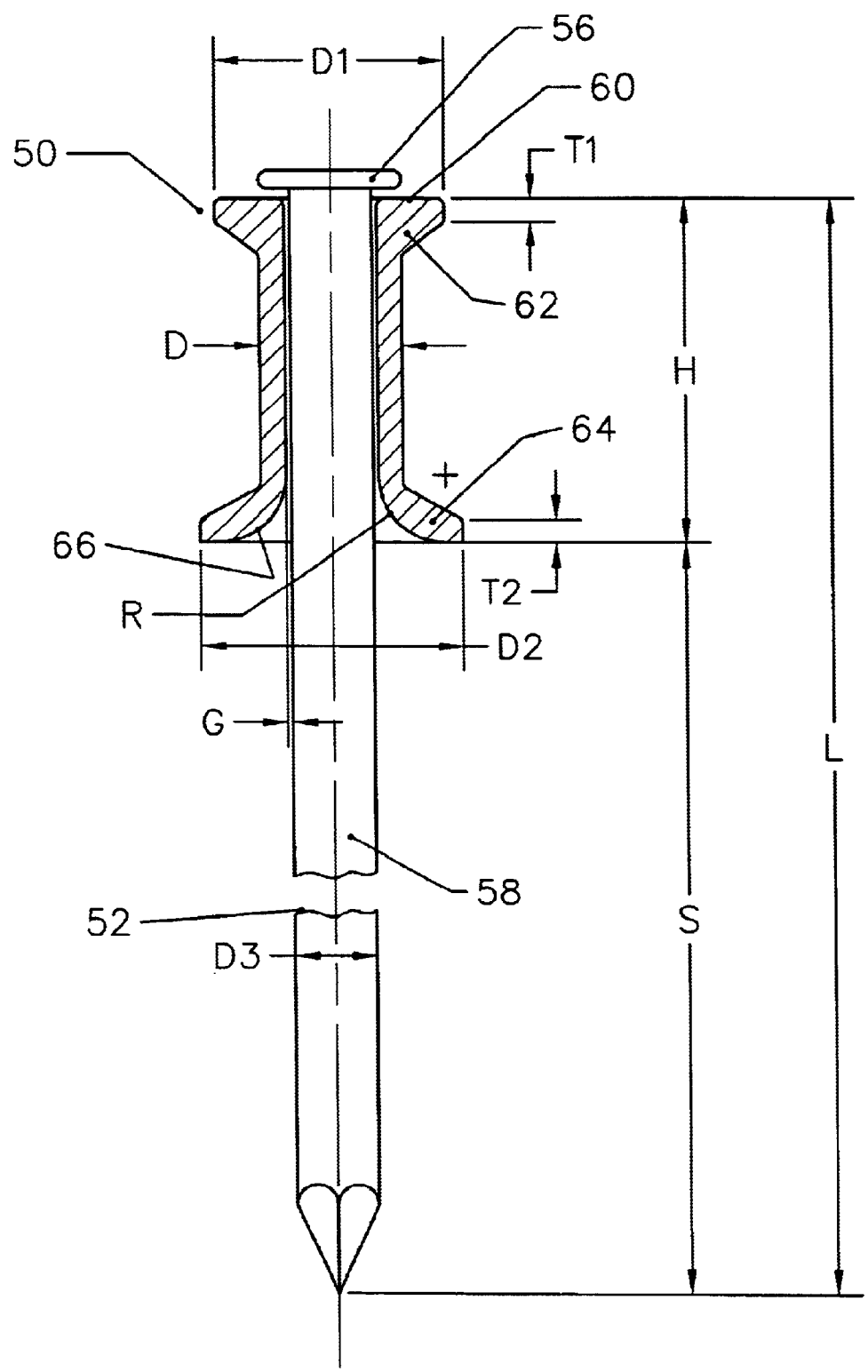
FIG. 5 is an elevation of the second embodiment of a fastener with a section view of the sleeve element for wood frame members showing the relationship between the elements.

FIG. 5 shows a second embodiment of a shear fastener 50 that consists of a first element metal stud 52, having at one end a head 56 with a larger diameter than the shaft body 58 and a second element sleeve 60. The sleeve 60 has diameter D at its most narrow external dimension, which is typically between 0.2 and 0.5 inches. The first head 62 has a diameter D1, which is preferably equal to 2D. The second head 64 has a diameter D2 preferably equal to or greater than 2.5D. The sleeve 60 has length H that should be greater than D for best pullout strength from the stucco. The height of sleeve 60 cannot exceed the thickness of the stucco wall panel. The thickness of the first head 62 of the sleeve 60 and the second head 64 is preferably D/2 or lees. The tapered surfaces of the first head 62 of the sleeve 60 and the second head 64 are preferably at 15 degrees to the face surfaces although other angles can be used.

The second element metal stud 52 has a shaft 58 diameter D3, which preferably has dimensions not exceeding D/2, which for use in stucco wall panels is between 0.125 inches and 0.25 inches diameter. The diameter of shaft 58 is chosen for the amount of energy absorption required in the shear fastener and for the amount of shear strength required in the shear fastener. Typically, the material for the fastener could be similar to low carbon 1008 steel that has been work hardened to a yield strength of 70,000 psi although many other variations are possible. As the diameter of shaft 58 increases, the shear fastener becomes stronger but with less ductility. This means that the fastener has reduced deflection under shear loading and, hence, has reduced energy absorption. The embedment length S of the shaft 58 into a wood frame member is preferably greater than 5D but less than 10D although other embedment depths may be employed, depending on the ductility required for the interconnection between the wood frame structure and the stucco building panel. The second element must have good fatigue resistance which means that the shaft 58 must have no roughness or rapid change in diameter that would act as a stress concentrator. A clearance G is provided between the sleeve 60 bore and the shaft 58 of the metal stud where the clearance is preferably less than D/50. The sleeve 60 also has an inner surface 66 with a radius R that is matched to the ductility requirements for the shear fastener when installed on a vertical building wall. Preferably this inner surface 66 has a radius greater that D/2.

Figure 6:
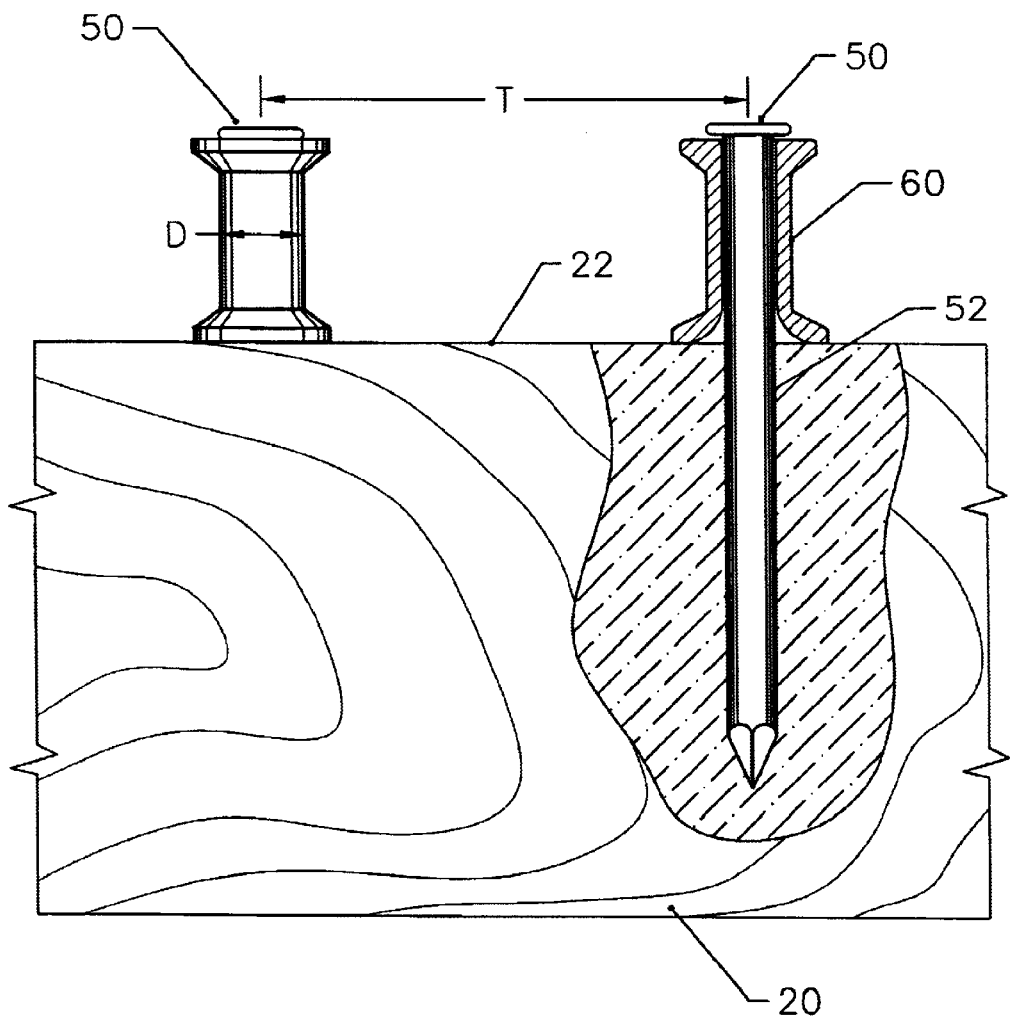
FIG. 6 is an elevation of the shear connection system with a partial cutaway section showing two fasteners embedded into the wood frame structure according to the second embodiment of the invention.

FIG. 6 shows two shear fasteners 50 of the second embodiment embedded into a wood frame member 20. Each shear fastener consists of a first element metal stud 52, which is shown as a standard nail in this embodiment, that is driven into the wood frame member 20 until the second element sleeve 60 seats firmly against the wood frame member surface 22. The metal studs are spaced apart distance T along the wood frame member 20 where T is preferably less than 10D for maximum strength in the stucco.

Figure 7:
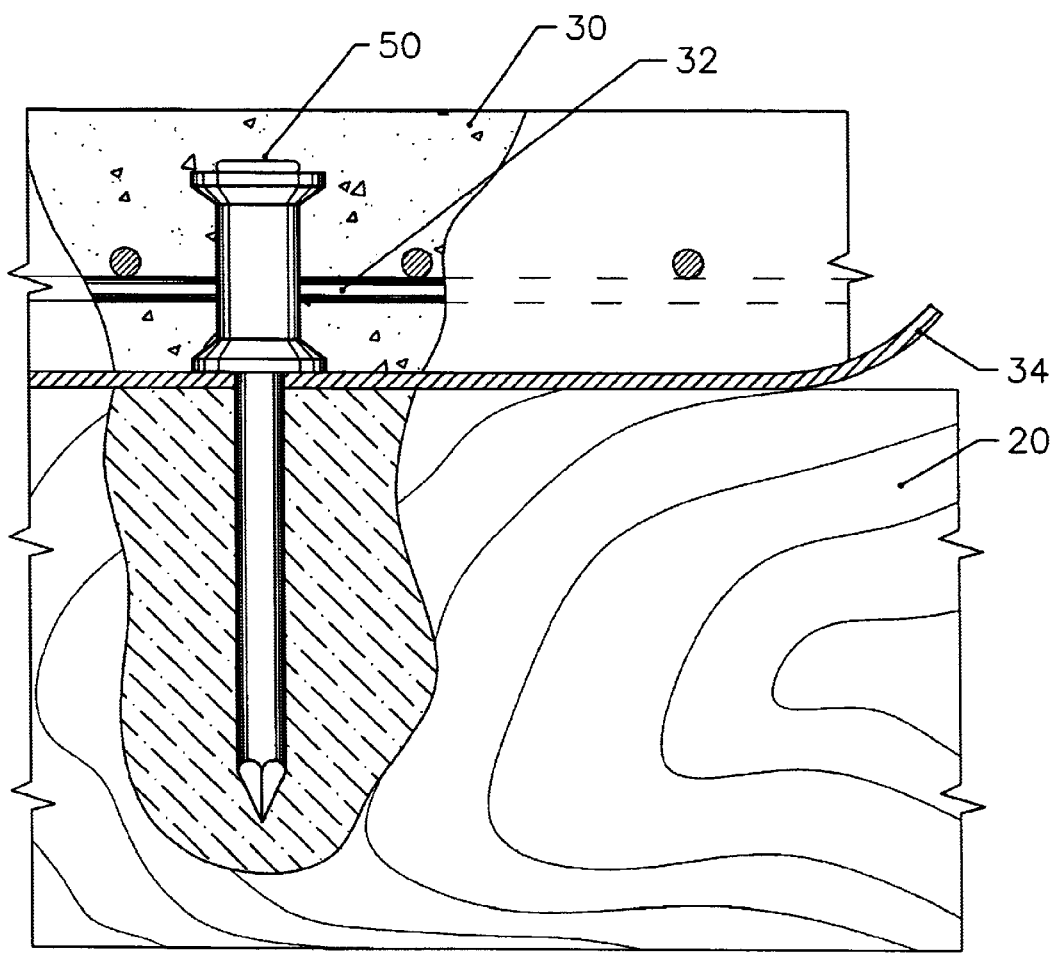
FIG. 7 is an elevation of the shear connection system with a partial cutaway section showing a fastener according to the second embodiment of the invention, the stucco wall panel, the wire mesh reinforcement, the building paper, and the wood frame structure.

FIG. 7 shows the second embodiment of the elements of the shear fastener system consisting of a single shear fastener 50, the stucco panel 30, the stucco lath reinforcement 32, building paper 34, and the wood frame member 20. The wire mesh 32 is embedded into the stucco panel 30 and is attached with fasteners that are not shown in this figure to the wood frame member 20. In its normal orientation, the wood frame member 18 is a vertical stud or a horizontal plate in the wall structure.

Figure 8A:
FIG. 8A is an elevation of one embodiment of the fastener element used in the second embodiment of the fastener.
Figure 8B:
FIG. 8B is an elevation of another embodiment of the fastener element used in the second embodiment of the fastener.
Figure 9A:
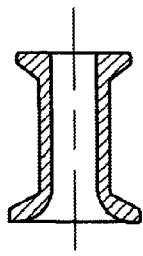
FIG. 9A is an elevation section of the one embodiment of the sleeve element of the second embodiment of the fastener.
Figure 9B:
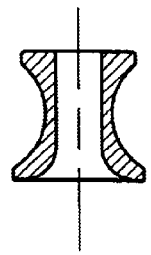
FIG. 9B is an elevation section of an alternative embodiment of the sleeve element of the second embodiment of the fastener.
Figure 9C:
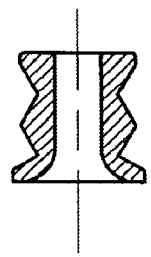
FIG. 9C is an elevation section of another alternative embodiment of the sleeve element of the second embodiment of the fastener.

FIG. 8A shows the first element 52a of a shear fastener 50 in a preferred embodiment where it is the shape of a common nail with very smooth surfaces. FIG. 8B shows an alternative embodiment for the first element 52b of the shear fastener 50 where it is a wood screw. FIG. 9A shows the second element 60a of a shear fastener 50 in the preferred embodiment where the shape is a cylinder with a beveled external profile. FIG. 9B shows another embodiment of the second element 60b. FIGS. 9A and 9B have generally hourglass shapes. FIG. 9C shows yet again another embodiment of the second element 60c in which at least two parts of the middle portion (between the upper and lower ends of the non-embedded segment) have a diameter less than the upper and lower ends.

Figure 10:
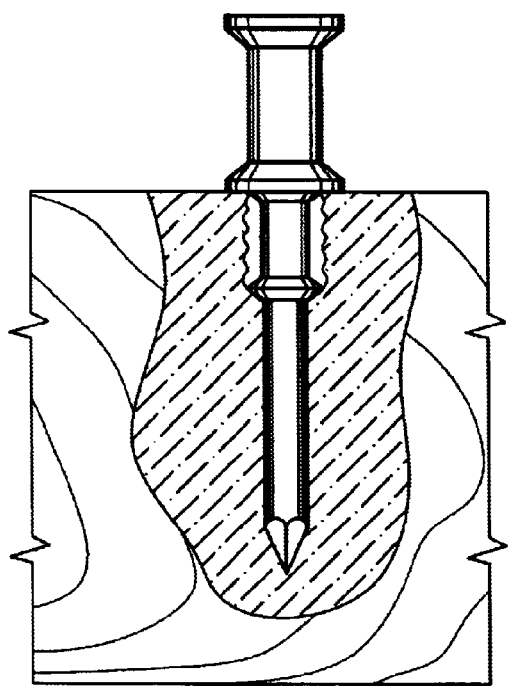
FIG. 10 is an elevation partial section of a single fastener with two shoulder sections.

In another embodiment shown in FIG. 10 the shear fastener consists of metal studs 70, each having at one end a head or section 74 with a larger diameter than the body of the metal stud 72, also having a second section 76 of larger diameter part way along the metal stud. This metal stud 70 is normally driven into a wood frame member until the second section 76 contacts building paper (not shown) at the surface 22 of the wood frame member 20. The metal stud 70 also has a third section 78 of larger diameter further along the metal stud from the second larger section 76. This third section 78 is driven into the wood frame member 20 to partially deform the fibres of the wood by creating a cavity 80 somewhat larger than the diameter of the body of the metal stud. The purpose of the cavity so created in the wood frame member is to reduce the resistance of the shear fastener to lateral motion caused by cyclic shear stresses and so provide greater lateral displacement and energy absorption than a rigid shear fastener.

Figure 11:
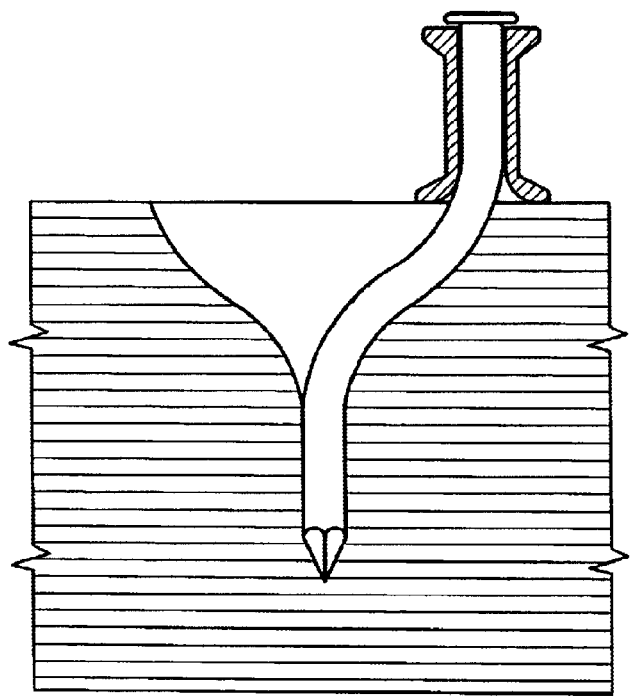
FIG. 11 is an elevation section of a two-part fastener of the second embodiment showing displacement of the shear fastener from its normal position by a shearing force applied on the sleeve element against the wood frame structure.

FIG. 11 demonstrates shear fasteners of the second embodiment provide greater ductility for the interconnection between a wood frame structure and a stucco building panel than the first embodiment. Great ductility is advantageous in some applications to provide large energy dissipation for building structures influenced by seismic activity. In this embodiment, the shear fastener 50 consists of two parts, the first part being a fastener or metal stud 52 such as a common nail, and the second part being a shear lock sleeve 60. The sleeve is shaped on the external surfaces in the same manner described in FIG. 6 to provide effective pullout and shear strength when embedded into the stucco material. The hole through the sleeve 60 provides a clearance fit for the shaft 58 of the fastener 52 so the fastener can be easily inserted into the sleeve. The sleeve 60 also has relieved internal edges or fillets 66 on the hole which are shaped to reduce the bending stress, and the resulting stress concentration, on the fastener during shear between the two components.

In practice, the fastener is placed through the sleeve and then is driven like a nail into the wood frame member 20 to create a shear fastener. The fastener is driven hard enough to force the sleeve into contact with the surface 22 of the wood frame member or other building material. The objective is to allow the sleeve, as an integral part of the stucco material, to move laterally during cyclic shear loading relative to the surface of the wood frame member. The fastener, which is driven into the wood frame member, will deform inelastically (i.e. bend) during the cyclic shear loading and so absorb energy for every cycle while maintaining the attachment of the stucco wall cladding to the wooden wall frame. The movement of the fastener during the cyclic shear loading causes distortion and failure of the fibres 92 in the wood frame member, which also absorbs energy for every cycle. The assembly of this embodiment is therefore adapted to allow the embedded portion of the assembly to bend in relation to the bottom of the non-embedded portion. The fillets or taper 66 enhances the ability of the embedded portion to bend at this point.

Figures 12, 13:
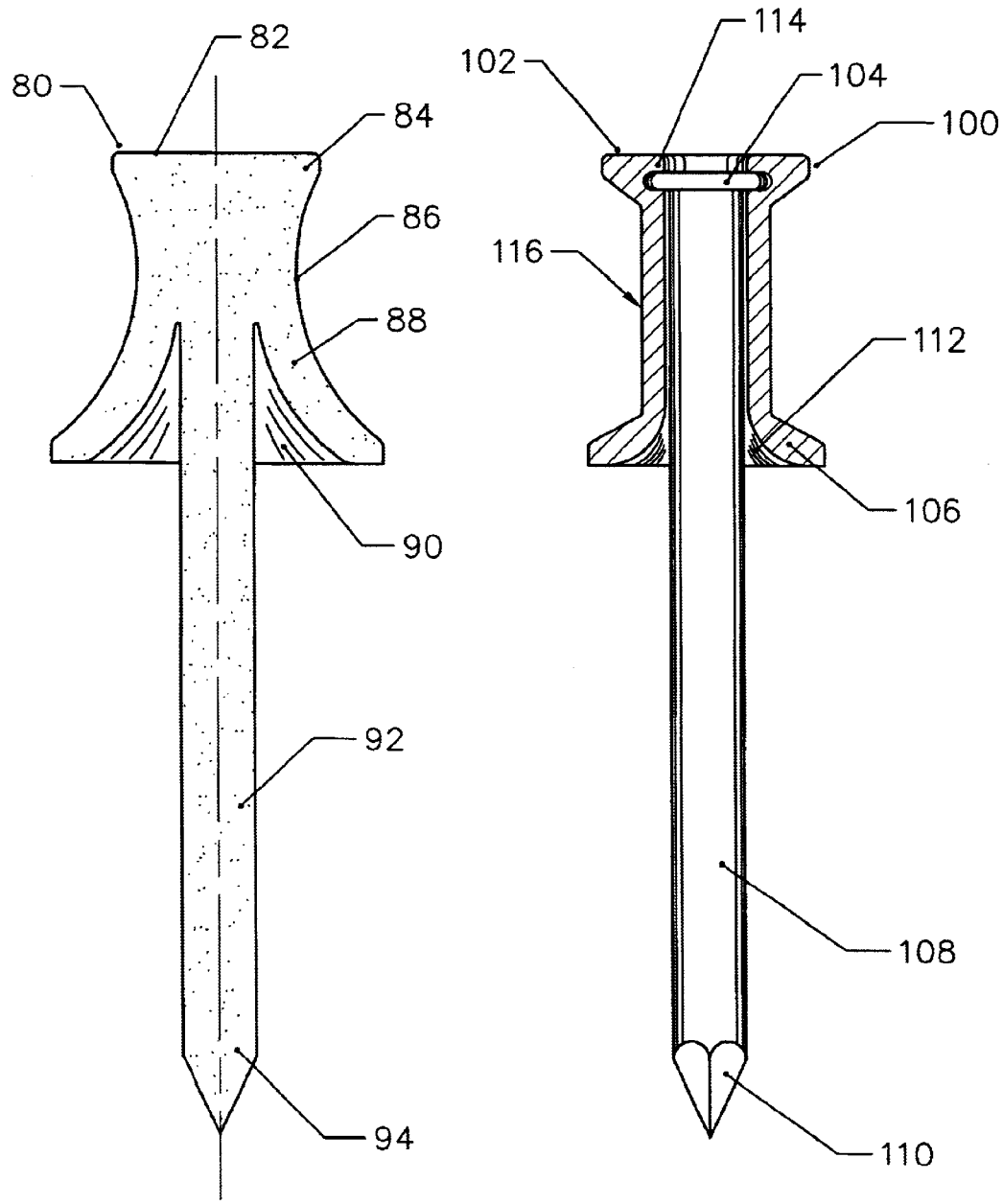
FIG. 12 is an elevation of a modification of the first embodiment of a shear stud fastener in full cutaway section showing the relationship between the elements.
FIG. 13 is an elevation of a further modification of the first embodiment of a shear stud fastener in full cutaway section showing the relationship between the elements.

FIG. 12 shows an embodiment of a metal shear stud fastener 80 having at one end a upper body head 82 with a flat surface at the extreme end and a body with reduced cross-section diameter 86 midway between the upper end 84 and the lower end 88. The shear stud fastener 80 has a lower body shaft 92 that is attached to the upper head 82 internally to the upper body head such that a clear space 90 is left between the shaft and head. The lower body shaft has a pointed end 94 designed for penetrating wood. The lower end 88 of the upper body head 82 is flat for contact with the wood framing member into which the shear stud fastener is inserted, in a manner shown in FIG. 2.

FIG. 13 shows another embodiment of a metal shear stud fastener 100 having two integral elements, the first element being a metal stud 108, and a second element being a metal sleeve 102, both elements rigidly integrated in the region of the head 104 of the metal stud. The first element is locked into the second element by a metal cap 114 on the upper surface of the sleeve 102 so that no motion between the two elements in the region of the metal stud head 104 can occur. The sleeve 102 has a formed inner shape that provides clearance 112 between the sleeve surface and the shaft of the metal stud. The sleeve also has a formed outer surface with a reduced cross-section diameter 116 midway between the upper end and the lower end of the sleeve. The first element shaft has a pointed end 110 designed for penetrating wood. The lower end 106 of the second element sleeve is flat for contact with the wood framing member into which the shear stud fastener is inserted, in a manner shown in FIG. 2.

The metal shear stud fastener 80 in FIG. 12 is normally driven into a wood framing member and embedded into stucco to form a shear connector between the building wood frame and a stucco wall panel. The shape of the upper body head 82 ensures that the fastener will not pull out from the stucco under shear loading. The clearance 90 between the lower body shaft 92 and the upper head 82 allows ductile deformation of the lower body shaft 92 under cyclic shear loading as shown in FIG. 11. If the lower body shaft is connected to the upper body head without the clearance space 90, similar to the shear fastener shown in FIG. 1, cyclic shear loading of the fastener will cause rapid fatigue failure of the metal at the region of the joint between the lower body shaft and the upper body head. A similar analysis can be applied to the metal shear stud fastener 100 in FIG. 13 where clearance space 112 allows ductile deformation of the lower body shaft 108 during cyclic shear loading.

The metal shear stud fasteners shown in FIG. 12 and FIG. 13 allow no relative axial motion between the lower body shaft and the upper body head. This has an advantage when the shear stud fastener is inserted into a wood framing member with high moisture content. As the wood dries out, the metal shaft of the lower body does not change length while the wood shrinks. Since the lower body shaft will not insert further into the wood frame member than it was originally placed, the result of wood shrinkage is that the shear stud fastener is displaced away from the surface of the wood by a small amount. This motion of the shear stud fastener carries the stucco wall panel that is bonded to the upper body head away from the wood frame member which is not normally a cause for concern in the strength or durability of the wall structure.

However, if the metal shear stud fastener is a two piece assembly, such as shown in FIG. 5, which allows relative axial motion between the lower shaft body and the upper body head, certain problems occur when the shear studs are used with wet wood. As the wood dries out, the metal shaft of the lower body is displaced away from the surface of the wood frame member. Since there is no positive connection between the lower body shaft and the upper body head, the upper body head that is embedded in the stucco wall panel remains stationary while the head 56 of the lower body shaft in FIG. 5 projects upward into the stucco. The result of this motion is that the head of the lower body shaft breaks a small segment out of the stucco exposing the shear fastener to the open environment and creating a breach in the wall surface that affects the durability of the wall structure.

It will be appreciated that one of the main purposes of this engineered stucco shear wall system is to provide energy absorption for a wood framed building wall during cyclic shear loading applied in the plane of the wall. Seismic activity, which acts through the foundation of the building against the inertia of the structure, is the primary cause of this cyclic loading. The wall must accomplish two functions. It must provide for lateral displacement with energy dissipation or absorption during the cyclic motion. It must provide significant structural strength during the cyclic shear motion to support the building structure while preventing the stucco wall finish from separating from the wall frame. The engineered stucco shear wall system can be adapted to achieve both functions.

It will also be appreciated that, while the reinforced structural member of the present invention is especially adapted for use with building panels made from stucco, the building panel may be constructed from any other suitable building material. Accordingly, the material of the building panel may comprise any suitable material capable of hardening from a liquid or semi-liquid state to a solid state which will adhere to the projections of the reinforcing member which the material surrounds.

The preferred embodiments of the invention use fasteners or studs that have substantially circular cross sections. However, it is within the scope of the invention to use cross sectional shapes that are not substantially circular. For example the embedded and non-embedded portions of the fasteners may have oval, square or star-shaped cross sections. In discussing the dimensions of the preferred embodiments (having substantially circular cross sections) this disclosure has referred to the diameters of the respective portions. However, the same relative dimensions may be used in the case of non-circular cross sections, except that in such cases the dimensions referred to are in relation to the effective diameter of the portions involved, namely to the maximum cross sectional extent of the cross section of the portions.

It will be appreciated that other variations or modifications to the preferred embodiments may be practised without nonetheless departing from the principles and scope of the invention.

What is claimed is:
1. A stucco wall construction comprising:
a wood frame;
stucco lath secured to said wood frame by a plurality of first fasteners;
a plurality of second fasteners, each comprising an elongated first portion embedded in said wood frame and an elongated second portion not embedded in said wood frame, said second portion including an upper end spaced from the surface of said wood frame, a lower end bearing against said wood frame and a narrowed middle portion between the fist and second ends, said elongated first portion spaced apart from an inner surface of said lower end by a clearance; and, stucco applied to said stucco lath so as to substantially embed said second portion in said stucco,
wherein said upper end is integrally formed with said first portion.

2. A stucco wall construction as in claim 1 wherein said second portion has an hourglass shape.

3. A stucco wall construction as in claim 1 wherein said upper end, lower end and middle portion each have an "effective diameter" defined as the diameter in the case of a substantially circular cross section and defined as the maximum cross sectional extent in the case of a cross section that is not substantially circular and wherein said middle portion includes a plurality of sections of reduced effective diameter in relation to said upper and lower ends.

4. A stucco wall construction as in claim 3 wherein said upper end has an effective diameter that is at least twice an effective diameter of the middle portion of said second portion.

5. A stucco wall construction as in claim 3 wherein said lower end has an effective diameter that is at least two times the effective diameter of the middle portion.

6. A stucco wall construction as in claim 3 wherein said upper and lower ends have effective diameters that are at least two times the effective diameter of the middle portion and wherein the length of the second portion is at least the same as the effective diameter of said middle portion.

7. A stucco wall construction as in claim 3 wherein said upper and lower ends have effective diameters that are at least two times the effective diameter of the middle portion and wherein said first portion has a length at least five times the effective diameter of said middle portion and an effective diameter more than one half the effective diameter of said middle portion and less than the effective diameter of said middle portion.

8. The stucco wall construction of claim 1 wherein said middle portion has a diameter in the range of 0.2 inches to 0.5 inches.

9. A stucco wall construction as in claim 1 wherein said first portion is adapted to bend in relation to said lower end.

10. A stucco wall construction as in claim 9 wherein said second portion has an hourglass shape.

11. A fastener assembly for use in a stucco wall construction comprising a first element having an elongated portion and a head portion, said elongated portion having a substantially uniform cross section along its length, and a second element having an aperture for receiving said first element therethrough, whereby to maintain said head of said first element in a predetermined spaced relationship to a surface in which said first element is embedded, said second element comprises an upper end having a surface that tapers inward toward a middle portion of said second element.

12. A fastener assembly as in claim 11 wherein said second element has a lower end and said upper end, lower end and middle portion each have an "effective diameter" defined as the diameter in the case of a substantially circular cross section and defined as the maximum cross sectional extent in the case of a cross section that is not substantially circular, and wherein said upper end has an effective diameter that is at least twice the effective diameter of said middle portion, said lower end has an effective diameter that is at least 2.5 times the effective diameter of said middle portion, and said second element has a length greater than the effective diameter of said middle portion.

13. A fastener assembly as in claim 12 wherein said middle portion includes a plurality of sections of reduced effective diameter in relation to said upper and lower ends.

14. A fastener assembly as in claim 11 wherein said second element comprises a lower end and wherein said upper and lower ends are enlarged in relation to said middle portion.

15. A fastener assembly as in claim 11, wherein said second element comprises a lower end, and wherein said upper end, lower end and middle portion each have an "effective diameter" defined as the diameter in the case of a substantially circular cross section and defined as the maximum cross sectional extent in the case of a cross section that is not substantially circular, and wherein said middle portion includes a plurality of sections of reduced effective diameter in relation to said upper and lower ends.

16. The fastener assembly of claim 11 wherein said first element comprises a nail.

17. The fastener assembly of claim 11 wherein said second element comprises a lower end and wherein said aperture is flared outwardly in its portion toward said lower end.

18. The fastener assembly of claims 17 wherein a wall, of said aperture extends generally perpendicular to said elongated portion at said lower end.

19. A fastener assembly as in claim 11 wherein said aperture provides clearance between said elongated portion of said first element and a lower end of said second element.

20. A method of applying stucco to a wall having wood frame members wherein said stucco is applied to a lath or a wire mesh, comprising, fastening said lath or wire mesh to said wood frame members by means of first fasteners, securing a plurality of the assemblies of claim 11 by driving said elongated portion of said first element through said aperture and into said wood frame member, and applying stucco to substantially embed said second element in said stucco.

21. A stucco wall construction comprising a wood frame, stucco lath secured to said wood frame by a plurality of first fasteners, a plurality of second fasteners embedded in said wood, said second fasteners comprising a fastener assembly having a first element having an elongated portion and a head portion, said elongated portion having a substantially uniform cross section along its length, and a second element having a passageway for receiving said first element therethrough, whereby to maintain said head of said first element in a predetermined spaced relationship to a surface in which said first element is embedded, said second element has an upper end and a lower end, and wherein said second element encloses the head of said first element in said upper end so as to restrain it from extending upward through the upper end of said passageway.

22. A stucco wall construction as in claim 21 wherein there is clearance between said lower end and said first element.

23. The stucco wall construction of claim 21 wherein said first element comprises a nail.

24. A stucco wall construction as in claim 21 wherein said passageway provides clearance between said elongated portion of said first element and said lower end of said second element.

25. A fastener assembly for use in a stucco wall construction comprising a first element having an elongated portion and a head portion, said elongated portion having a substantially uniform cross-section along its length, and a second element having a passageway for receiving said first element therethrough, whereby to maintain said head of said first element in a predetermined spaced relationship to a surface in which said first element is embedded, said second element having an upper end and a lower end, and wherein said second element encloses the head of said first element in said upper end so as to restrain it from relative upward axial movement.

26. A method of applying stucco on the wood frame of a building wall comprising the steps of:

secuting stucco lath to said wood frame with a plurality of first fasteners;

embedding in said wood frame a plurality of second fasteners, said second fasteners comprising an elongated first portion embedded in said wood frame and a second portion not embedded in said wood frame, said second portion including a first head spaced from the surface of said wood frame a second head bearing against said wood frame and a narrowed middle portion between the first and second heads, said elongated first portion separated from an inner surface of said second head by a clearance; and, applying stucco to said stucco lath so as to substantially embed said first and second heads of said second fasteners in said stucco, wherein said second portion includes an upper end and a lower end, and said upper end is integrally formed with said first portion.

27. A fastener assembly for use in a stucco wall construction, said fastener assembly comprising:

a first part having an elongated portion, said elongated portion having a substantially uniform cross section along its length; and, a second part comprising an upper end having an inner surface that tapers inward toward a middle portion of said second part and a lower end;

wherein said upper end of said second part is integral with said elongated portion of said first part and said elongated portion of said first part extends through a passageway in said lower end of said second part and is separated from said lower end of said second part by a clearance.

28. The fastener assembly of claim 27 wherein a middle portion of said second part has a diameter in the range of 0.2 inches to 0.5 inches.

* * * * *